(12) United States Patent
Laurance et al.

(10) Patent No.: US 11,775,663 B2
(45) Date of Patent: Oct. 3, 2023

(54) METHOD AND SYSTEM FOR CONTROLLING ACCESS TO DATA

(71) Applicant: JPMorgan Chase Bank, N.A., New York, NY (US)

(72) Inventors: David Laurance, Dobbs Ferry, NY (US); Michael George Norman, Edinburgh (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 299 days.

(21) Appl. No.: 17/159,523

(22) Filed: Jan. 27, 2021

(65) Prior Publication Data

US 2021/0232696 A1 Jul. 29, 2021

Related U.S. Application Data

(60) Provisional application No. 62/966,185, filed on Jan. 27, 2020.

(51) Int. Cl.
*G06F 21/62* (2013.01)
*G06F 16/21* (2019.01)

(52) U.S. Cl.
CPC .......... *G06F 21/6209* (2013.01); *G06F 16/21* (2019.01)

(58) Field of Classification Search
CPC ... G06F 21/6209; G06F 16/21; G06F 21/6218
USPC ........................................................ 726/26
See application file for complete search history.

(56) References Cited

U.S. PATENT DOCUMENTS

| | | | | |
|---|---|---|---|---|
| 7,904,431 | B1* | 3/2011 | Berger | G06F 30/20 707/790 |
| 2005/0021541 | A1 | 1/2005 | Rangadass et al. | |
| 2007/0106629 | A1* | 5/2007 | Endacott | G06N 5/025 706/47 |
| 2009/0198697 | A1* | 8/2009 | Bilger | G06F 21/6227 707/999.009 |
| 2014/0181003 | A1 | 6/2014 | Kling et al. | |
| 2014/0279839 | A1* | 9/2014 | Balzar | G06F 16/20 707/607 |

OTHER PUBLICATIONS

Tsintsabadze, L., A Prototype to Analyze Role- and Attribute-Based Access Control Models, University of Tartu, Institute of Computer Science, Software engineering Curriculum, Master's Thesis, Aug. 14, 2017.
International Search Report and Written Opinion in corresponding International Application No. PCT/US21/15253, dated Apr. 8, 2021.

\* cited by examiner

*Primary Examiner* — Kambiz Zand
*Assistant Examiner* — Aubrey H Wyszynski
(74) *Attorney, Agent, or Firm* — Greenblum & Bernstein, P.L.C.

(57) ABSTRACT

A method for controlling access to a set of data is provided. The method includes receiving, via an interface, a request from an agent to access the set of data in a database; extracting an access criterion relating to a predefined data access constraint and a predetermined data access policy from the request; and determining whether the agent is granted access to the set of data using the criterion, where the access criterion is based on an attribute that is associated with an element within the set of data.

20 Claims, 6 Drawing Sheets

METHOD AND SYSTEM FOR CONTROLLING ACCESS TO DATA

CROSS-REFERENCE TO RELATED APPLICATIONS

This application claims the benefit of U.S. Provisional Patent Application Ser. No. 62/966,185, filed Jan. 27, 2020, which is hereby incorporated by reference in its entirety.

BACKGROUND

1. Field of the Disclosure

This technology generally relates to methods and systems for protecting a set of data, and more particularly to methods and systems for controlling access to a set of data using access control policy and attributes of the set of data.

2. Background Information

Many business entities collect and utilize large volumes of data by using database management systems to implement database schemas that define sets of data in a database. Historically, the use of such database schemas has resulted in varying degrees of success with respect to manipulating the set of data, providing access to the set of data, and validating the set of data.

One drawback of using conventional database schemas such as, for example, a relational database schema is that in many instances, the storage structure must be clearly defined. As a result, the rigid structures of predefined tables do not allow for a logical approach to retrieving data which is independent of the mechanism of storing and retrieving of individual sets of the data. In addition, defining the storage structure at the table definitions level results in application-specific storage structures that requires retooling for implementation on different applications and platforms.

In order to apply a data access control consistently across multiple data sets, there is a need for the sets of data themselves to be described in such a way that a consistent policy can be applied independent of the database schema of the individual data set enabling use by different applications and allowing for the control of access to sets of data using attributes of the sets of data.

SUMMARY

The present disclosure, through one or more of its various aspects, embodiments, and/or specific features or sub-components, provides, inter alia, various systems, servers, devices, methods, media, programs, and platforms for controlling access to a set of data using access control policy and attributes of the set of data.

According to an aspect of the present disclosure, a method for controlling access to a set of data is provided. The method is implemented by at least one processor. The method may include receiving, via an interface, at least one request from at least one agent to access the set of data in at least one database, the at least one agent may include at least one from among a human agent and a non-human software agent; extracting at least one criterion relating to a predefined data access constraint and a predetermined data access policy from the at least one request; and determining whether the agent may be granted access to the set of data using the at least one criterion, wherein the at least one criterion may be based on at least one attribute that is associated with at least one element within the set of data.

In accordance with an exemplary embodiment, the method may further include defining a metamodel for at least one control objective; determining a data framework based on the at least one request; and expressing the metamodel in the determined data framework.

In accordance with an exemplary embodiment, the metamodel may include at least one class, the at least one class may include at least one from among a policy class, an asset specification class, a party specification class, an action specification class, a rule class, and a constraint class.

In accordance with an exemplary embodiment, the at least one control objective may include a rule that defines a desired control outcome for a set of participants.

In accordance with an exemplary embodiment, the at least one access criterion may be linked to the at least one control objective based on the at least one attribute.

In accordance with an exemplary embodiment, the at least one attribute may be derived from at least one physical data model relating to a representation of systems that store and manage the set of data.

In accordance with an exemplary embodiment, the at least one attribute may be derived from at least one logical data model relating to a representation of application-level descriptions of the set of data.

In accordance with an exemplary embodiment, the at least one attribute may be derived from at least one business taxonomy relating to an enterprise-level classification of the set of data based on the predetermined data access policy, the business taxonomy may include application-independent descriptions of the set of data.

In accordance with an exemplary embodiment, the at least one attribute may be derived from at least one data lineage relating to lifecycle information for the set of data, the lifecycle information may include at least one from among origin information for the set of data and movement history information for the set of data.

In accordance with an exemplary embodiment, the predetermined data access policy may correspond to at least one from among a business requirement, a regulatory requirement, a customer requirement, and an operational requirement.

According to an aspect of the present disclosure, a computing device configured to implement an execution of a method for controlling access to a set of data is disclosed. The computing device comprising a processor; a memory; and a communication interface coupled to each of the processor and the memory, wherein the processor may be configured to receive, via an interface, at least one request from at least one agent to access the set of data in at least one database, the at least one agent may include at least one from among a human agent and a non-human software agent; extract at least one access criterion relating to a predefined data access constraint and a predetermined data access policy from the at least one request; and determine whether the at least one agent may be granted access to the set of data using the at least one access criterion, wherein the at least one access criterion may be based on at least one attribute that is associated with at least one element within the set of data.

In accordance with an exemplary embodiment, the processor may be further configured to define a metamodel for at least one control objective; determine a data framework based on the at least one request; and express the metamodel in the determined data framework.

In accordance with an exemplary embodiment, the metamodel may include at least one class, the at least one class may include at least one from among a policy class, an asset specification class, a party specification class, an action specification class, a rule class, and a constraint class.

In accordance with an exemplary embodiment, the at least one control objective may include a rule that defines a desired control outcome for a set of participants.

In accordance with an exemplary embodiment, the processor may be further configured to link the at least one access criterion to the at least one control objective based on the at least one attribute.

In accordance with an exemplary embodiment, the processor may be further configured to derive the at least one attribute from at least one physical data model relating to a representation of systems that store and manage the set of data.

In accordance with an exemplary embodiment, the processor may be further configured to derive the at least one attribute from at least one logical data model relating to a representation of application-level descriptions of the set of data.

In accordance with an exemplary embodiment, the processor may be further configured to derive the at least one attribute from at least one business taxonomy relating to an enterprise-level classification of the set of data based on the predetermined data access policy, the business taxonomy may include application-independent descriptions of the set of data.

In accordance with an exemplary embodiment, the processor may be further configured to derive the at least one attribute from at least one data lineage relating to lifecycle information for the set of data, the lifecycle information may include at least one from among origin information for the set of data and movement history information for the set of data.

In accordance with an exemplary embodiment, the predetermined data access policy may correspond to at least one from among a business requirement, a regulatory requirement, a customer requirement, and an operational requirement.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
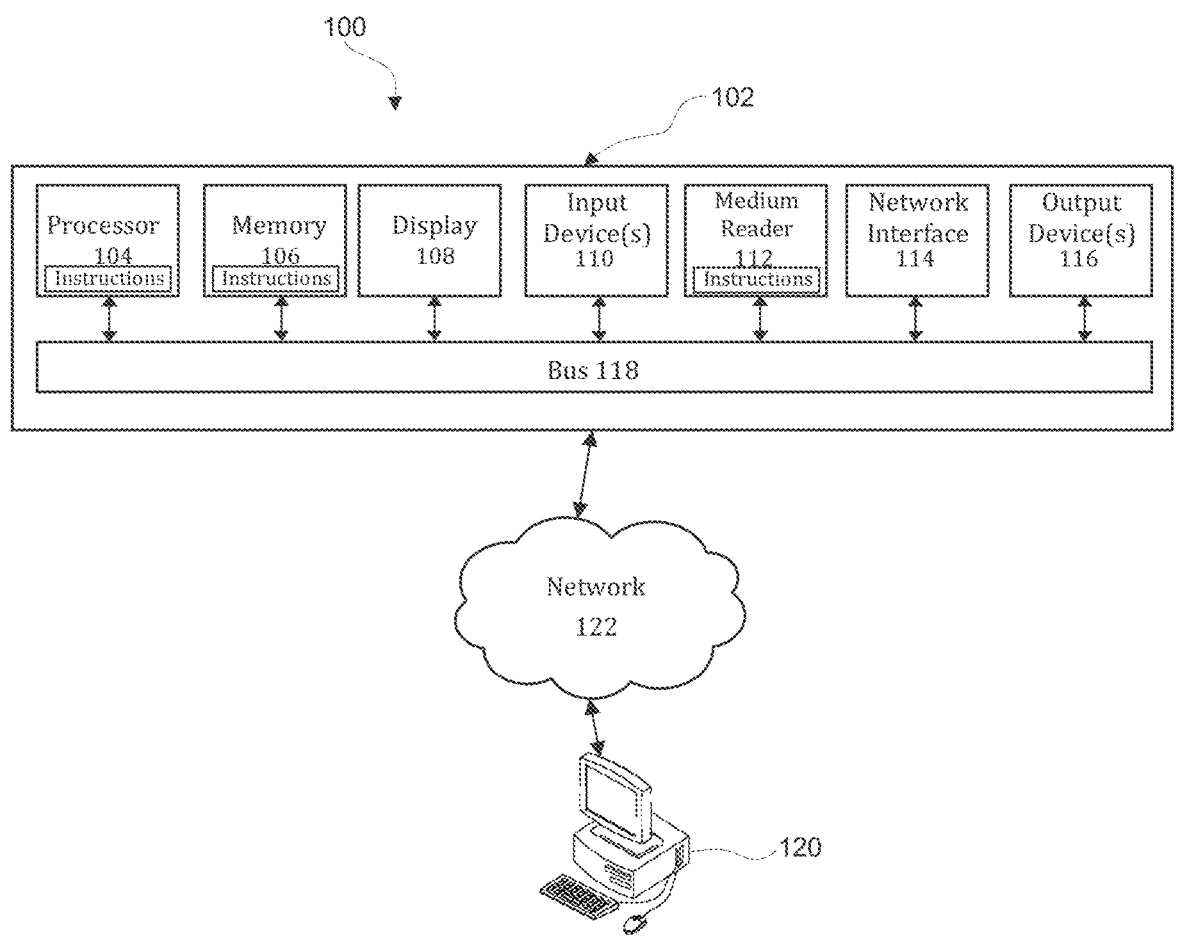
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for controlling access to a set of data using access control policy and attributes of the set of data.

Figure 2:
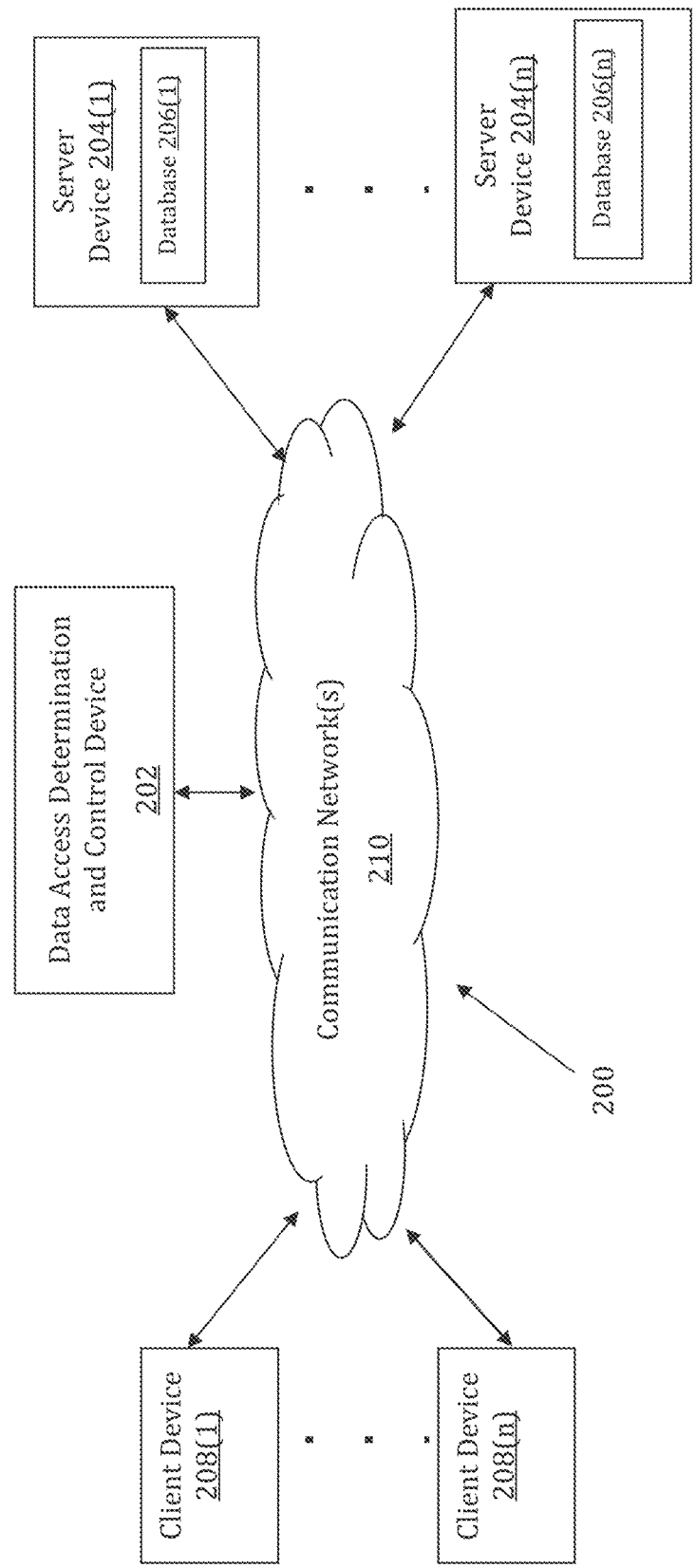
FIG. 2 illustrates an exemplary diagram of a network environment.

Referring to FIG. 2, a schematic of an exemplary network environment 200 for implementing a method for controlling access to a set of data using access control policy and attributes of the set of data is illustrated. In an exemplary embodiment, the method is executable on any networked computer platform, such as, for example, a personal computer (PC).

The method for controlling access to a set of data using access control policy and attributes of the set of data may be implemented by a Data Access Determination and Control (DADC) device 202 The DADC device 202 may be the same or similar to the computer system 102 as described with respect to FIG. 1. The DADC device 202 may store one or more applications that can include executable instructions that, when executed by the DADC device 202, cause the DADC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DADC device 202 itself, may be located in virtual server(s) running in a cloud-based computing environment rather than being tied to one or more specific physical network computing devices. Also, the application(s) may be running in one or more virtual machines (VMs) executing on the DADC device 202. Additionally, in one or more embodiments of this technology, virtual machine(s) running on the DADC device 202 may be managed or supervised by a hypervisor.

In the network environment 200 of FIG. 2, the DADC device 202 is coupled to a plurality of server devices 204(1)-204(n) that hosts a plurality of databases 206(1)-206(n), and also to a plurality of client devices 208(1)-208(n) via communication network(s) 210. A communication interface of the DADC device 202, such as the network interface 114 of the computer system 102 of FIG. 1, operatively couples and communicates between the DADC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DADC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DADC; devices that efficiently implement a method for controlling access to a set of data using access control policy and attributes of the set of data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DADC device 202 may be a standalone device or integrated with one or more other devices or apparatuses, such as one or more of the server devices 204(1)-204(n), for example. In one particular example, the DADC device 202 may include or be hosted by one of the server devices 204(1)-204(n), and other arrangements are also possible. Moreover, one or more of the devices of the DADC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DADC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to dataset access constraints, dataset access policies, dataset attributes, and dataset storage.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DADC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e, a smart phone.

The client devices 208(1)-208(n) may nm interface applications, such as standard web browsers or standalone client applications, which may provide an interface to communicate with the DADC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DADC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DADC device 202, the server devices 204(1)-204(n), or the client devices 208(1)-208(n), for example, may be configured to operate as virtual instances on the same physical machine. In other words, one or more of the DADC device 202, the server devices 204(1)-204(n), or the client devices 208(1)-208(n) may operate on the same physical device rather than as separate devices communicating through communication network(s) 210. Additionally, there may be more or fewer DADC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks. Packet Data Networks (PDNs), the Internet, intranets, and combinations thereof.

Figure 3:
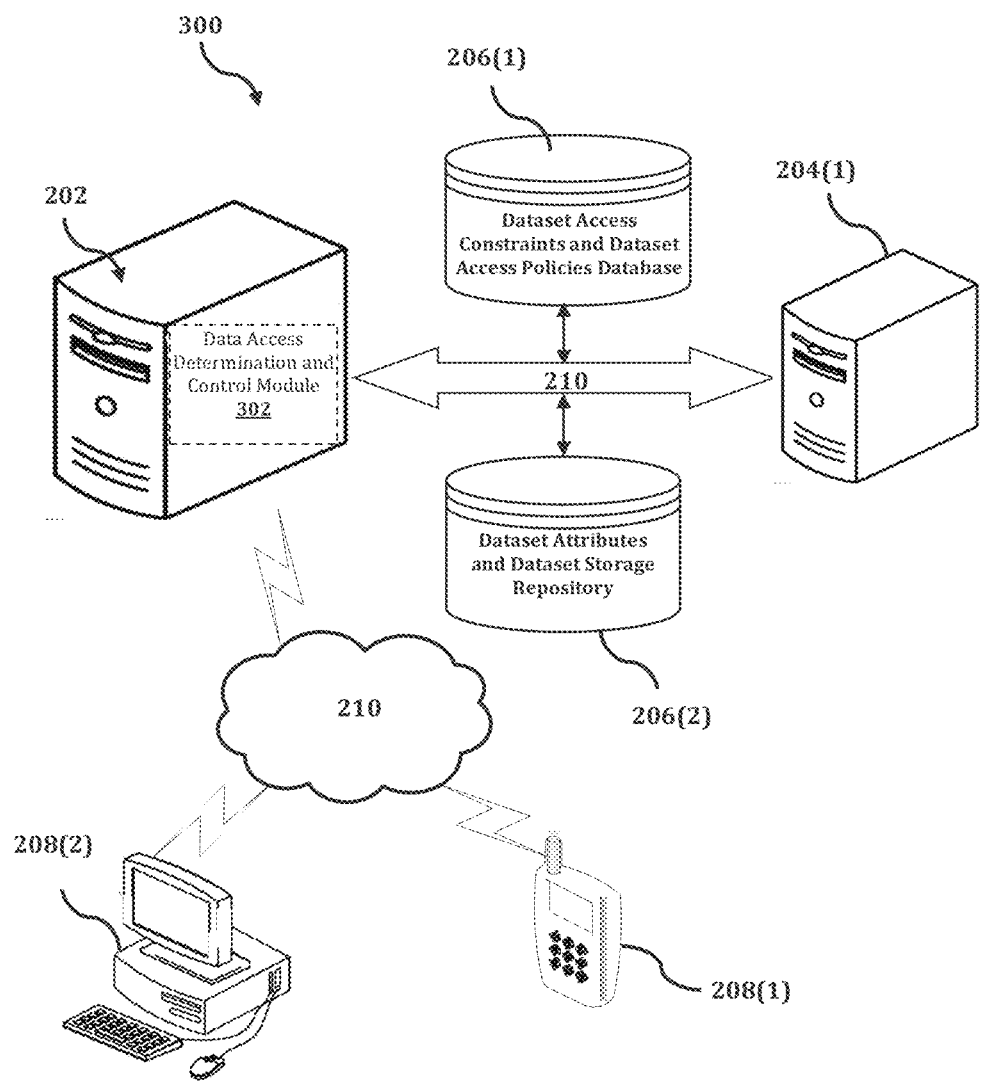
FIG. 3 shows an exemplary system for implementing a method for controlling access to a set of data using access control policy and attributes of the set of data.

The DADC device 202 is described and shown in FIG. 3 as including a data access determination and control module 302, although it may include other rules, policies, modules, databases, or applications, for example. As will be described below, the data access determination and control module 302 is configured to implement a method for controlling access to a set of data using access control policy and attributes of the set of data.

An exemplary process 300 for implementing a mechanism for controlling access to a set of data using access control policy and attributes of the set of data by utilizing the network environment of FIG. 2 is shown as being executed in FIG. 3. Specifically, a first client device 208(1) and a second client device 208(2) are illustrated as being in communication with DADC device 202. In this regard, the first client device 208(1) and the second client device 208(2) may be "clients" of the DADC device 202 and are described herein as such. Nevertheless, it is to be known and understood that the first client device 208(1) and/or the second client device 208(2) need not necessarily be "clients" of the DADC device 202, or any entity described in association therewith herein. Any additional or alternative relationship may exist between either or both of the first client device 208(1) and the second client device 208(2) and the DADC device 202, or no relationship may exist.

Further, DADC device 202 is illustrated as being able to access a dataset access constraints and dataset access policies database 206(1) and a dataset attributes and dataset storage repository 206(2). The data access determination and control module 302 may be configured to access these databases for implementing a method for controlling access to a set of data using access control policy and attributes of the set of data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DADC device 202 via broadband or cellular communication. Of course, these embodiments are merely exemplary and are not limiting or exhaustive.

Upon being started, the data access determination and control module 302 executes a process for controlling access to a set of data using access control policy and attributes of the set of data. An exemplary process for controlling access to a set of data using access control policy and attributes of the set of data is generally indicated at flowchart 400 in FIG. 4.

Figure 4:
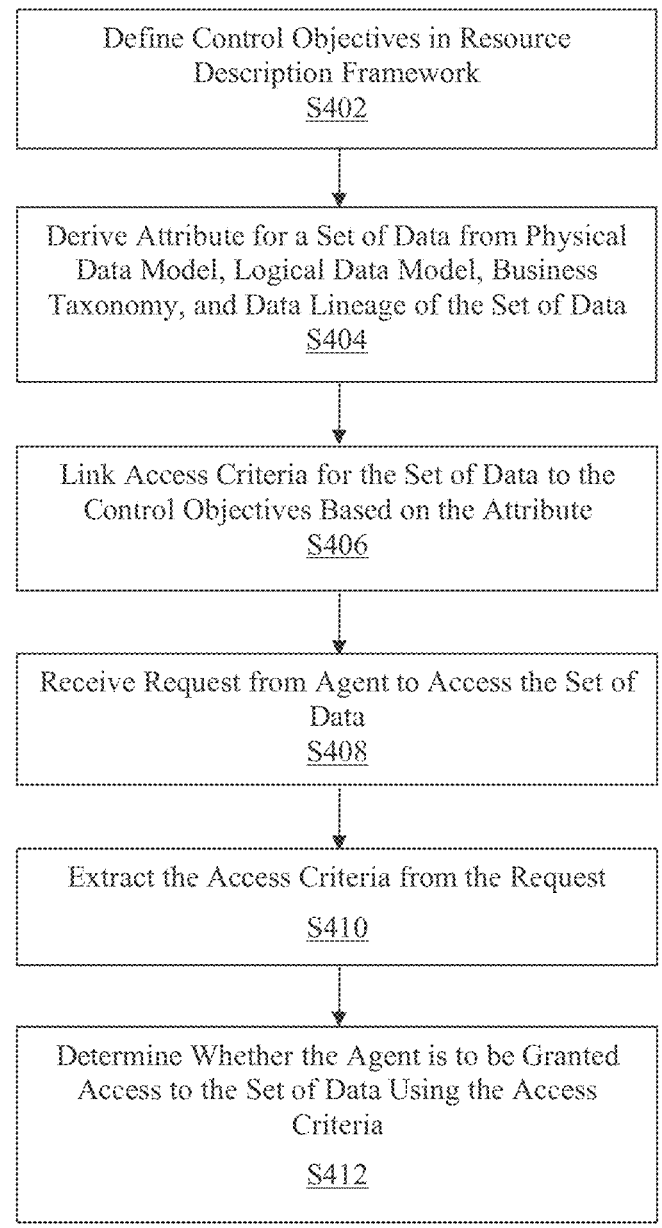
FIG. 4 is a flowchart of an exemplary process for implementing a method for controlling access to a set of data using access control policy and attributes of the set of data.

In the process 400 of FIG. 4, at step S402, a metamodel for control objectives in the form of an ontology may be formally defined and expressed in a data framework such as, for example, a Resource Description Framework (RDF), a JAVASCRIPT Object Notation (JSON) framework, an APACHE AVRO framework, a MICROSOFT Active Directory framework, and other commercial database frameworks with more restrictive attribute-based permission schemes. In an exemplary embodiment, the control objective may represent rules which define desired control outcomes for a set of participants and may be implemented using, for example, a Scoped Access Reference Implementation (SARI).

While general data policies may generally be specified across all participants, the SARI may only be concerned with access control policies such as, for example, with policies which constrain actions by users of data assets. The specific participants for which the control objectives apply may be defined by constraints over the set of actions, users, and data assets. The constraint may be described using the notion of NodeShape from a general-purpose RDF ontology. The general-purpose RDF ontology may include a computer programing language for describing and validating RDF graphs such as, for example, a Shapes Constraint Language (SHACL) as specified by the World Wide Web Consortium (W3C).

In another exemplary embodiment, the bulk of the metamodel for the control objective domain may be sourced directly from the W3C standard ontology. The W3C standard ontology may include a policy expression language such as, for example, the Open Digital Rights Language (ODRL) that provides a flexible and interoperable information model, vocabulary, and encoding mechanisms for representing statements about the usage of content and services. In another exemplary embodiment, the ODRL standard may be used to derive a proprietary digital rights language.

In another exemplary embodiment, metamodels for participants may be defined using the RDF ontologies. The metamodels may be models of a model such as, for example, a surrogate model for the analysis, construction, and development of the frames, rules, constraints, models, and theories applicable for modeling a predefined control objective.

In another exemplary embodiment, the metamodels may include classes such as, for example, a policy class, an asset specification class, a party specification class, an action specification class, a rule class, and a constraint class. The policy class may include a non-exempt group of permissions via a permission property, and/or prohibitions via a prohibition property, and/or duties via the obligation property. The policy class may include subclasses such as, for example, a set subclass of policy that may support expressing generic rules, an offer subclass of policy that may support offerings of rules from assigner parties, and an agreement subclass of policy that may support granting of rules from assigner to assignee parties.

The asset specification class may include a specification of the data assets, which are the subject of a rule via the abstract relation property. The party specification class may include a specification of the human or non-human actor that undertakes roles in a rule via the abstract function property. The action specification class may include a specification of operation on an asset. In another exemplary embodiment, under the SARI where read actions may be the primary focus, the action specification class may not be utilized in-depth and may be congruent with the specification class in the ODRL concept.

The rule class may include an abstract concept that represents the common characteristics of subclasses such as, for example, a permission subclass that may define the ability to exercise an action over an asset, a prohibition subclass that may define the inability to exercise an action over an asset, and a duty subclass that may define the obligation to exercise an action. In another exemplary embodiment, the permission subclass may have the duty property, which expresses an agreed upon action that must be exercised as a precondition to be granted the permission. The constraint class may include an expression that identifies the specific action, party, or assets that may be applicable to a rule.

At step S404, an attribute that is associated with an element within the set of data may be derived. In an exemplary embodiment, the attribute may be derived from a representation of systems that store and manage the set of data such as, for example, derived from a physical data model. In another exemplary embodiment, the attribute may be derived from a representation of application-level descriptions of the set of data such as, for example, derived from a logical data model.

In another exemplary embodiment, the attribute may be derived from an enterprise-level classification of the set of data based on a predetermined data access policy such as, for example, derived from a business taxonomy. The business taxonomy may include application-independent descriptions of the set of data that may, for example, be implemented on different application frameworks. In another exemplary embodiment, the attribute may be derived from lifecycle information for the set of data such as, for example, data lineage information. The lifecycle information may include at least one from among origin information for the set of data and movement history information for the set of data.

At step S406, access criteria for the set of data may be linked to the control objectives based on the attribute in an exemplary embodiment, the participant metamodels of the control objectives may be linked via a general-purpose RDF ontology for describing conditions. The general-purpose RDF ontology may include a computer programing language for describing and validating RDF graphs such as, for example, a Shapes Constraint Language (SHACL) as specified by the World Wide Web Consortium (W3C).

In another exemplary embodiment, the SHACL may be used to define the participants in the rule. Conditions may be provided as shapes and other constructs expressed in the form of an RDF graph. The RDF graphs that may be used in this manner may be called "shapes graphs" in SHACL and the RDF graphs that may be validated against the shapes graphs may be called "data graphs." The SHACL shapes graphs may be used to validate data graphs by ensuring that the data graphs satisfy a set of conditions. The SHACL shapes graphs may be viewed as a description of the data graphs that satisfied the set of conditions.

At step S408, a request may be received via an interface from an agent to access the set of data in a database. The agent may include at least one from among a human agent and a non-human software agent. The database may include any organized collection of data generally stored and accessed electronically from a computer system such as, for example, a distributed database and a relational database. In an exemplary embodiment, the interface may include at least one from among a graphical user interface (GUI) and an application programming interface (API). The API may include a standard application programming interface that is utilized for interactions with other software agents. The GUI may interact with and may be supported the API consistent with disclosures in the present application. In another exemplary embodiment, the database may include graph structures for semantic queries with nodes, edges, and properties to represent and store data such as, for example, in a graph database.

At step S410, access criteria may be extracted from the request. The access criteria may include agent identification information such as, for example, the role of the agent in the business, the agent's employee identification number, and the agent's authentication credentials as well as terminal information relating to the computing device where the agent made the request. The access criteria may also include predefined data access constraints for controlling how data may be entered into a table as well as predetermined data access policies for controlling agent actions on the data assets.

In another exemplary embodiment, the predetermined data access policies may include at least one from among a business requirement, a regulatory requirement, a customer requirement, and an operational requirement. The customer requirement may be associated with an external customer and integrated into the predetermined data access policies. The operational requirements may model business functions independent of what is required by the business. The operational requirements may be codified in multiple existing systems as well as represented as additional policies to enable understanding and management of relationships between the business functions and the business requirements.

Then, at step S412, whether the agent may be granted access to the set of data may be determined using the access criteria. The determination process may include the use of electronic data processing techniques such as, for example, batch processing, online processing, real-time processing, distributed processing, and artificial intelligent processing. The artificial intelligent processing may include machine learning algorithms such as, for example, any one or more of a Naïve Bayes classifier algorithm, a k-means clustering algorithm, and a support vector machine algorithm.

Figure 5:
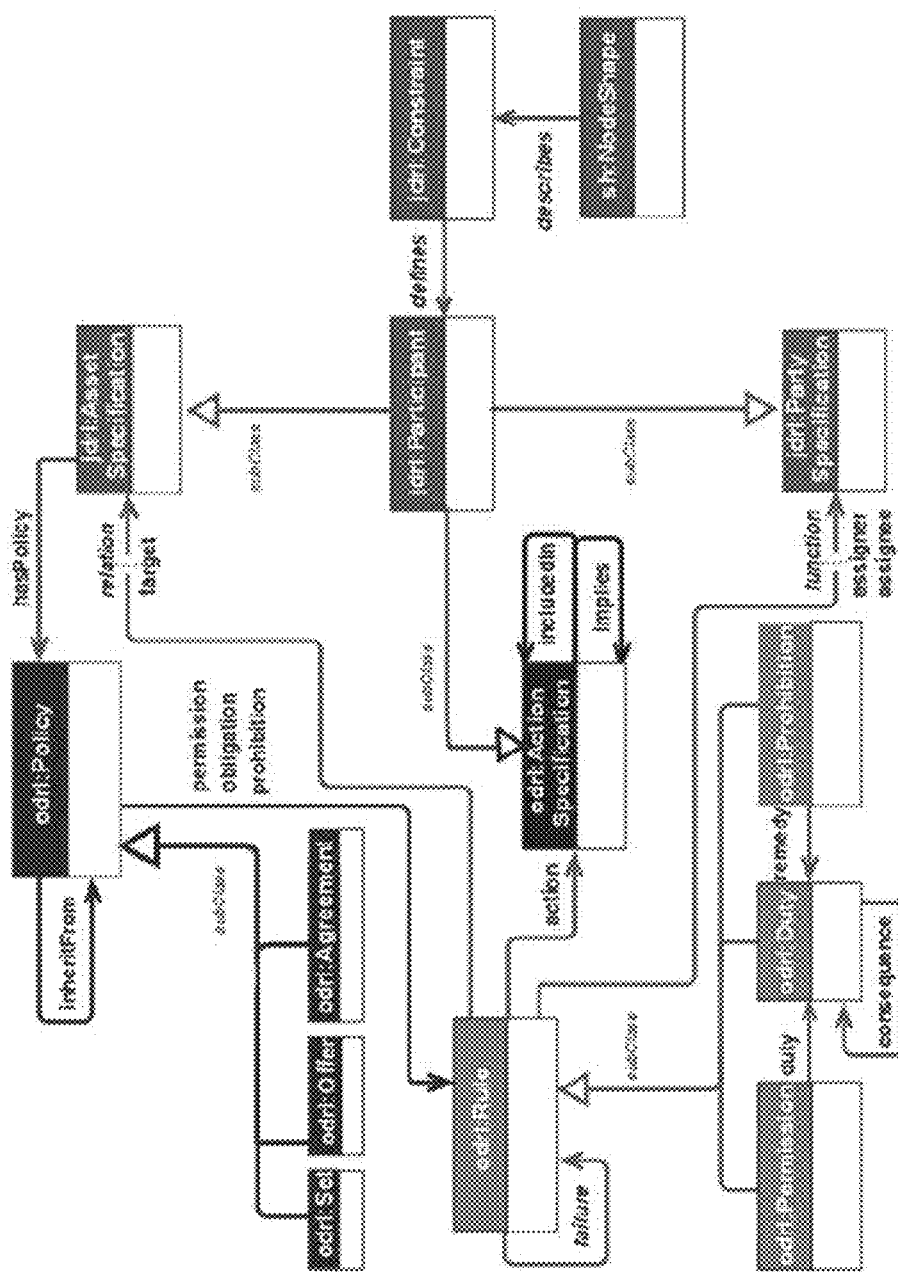
FIG. 5 is a diagram that illustrates an ontology for the control objective domain of an exemplary process for implementing a method for controlling access to a set of data using access control policy and attributes of the set of data.

FIG. 5 is a diagram 500 that illustrates an ontology for the control objective domain of an exemplary process for implementing a method for controlling access to a set of data using access control policy and attributes of the set of data. In FIG. 5, diagram 500 may be an exemplary reference implementation, which utilizes parts of the ODRL 2.2 standards and concepts based on the SHACL ontology. In an exemplary embodiment, diagram 500 may include odrl:Policy, odrl:Rule, and ActionExpression, which may include concepts strongly aligned with and similar to the ODRL standard.

The odrl:Policy may include an inheritFrom function, permission obligation prohibition function, and subclasses such as, odrl:Set, odrl:Offer, and odrl:Agreement. The odrl:Rule may include an action function, a failure function, a relation/target function, a function/assigner assignee function, and subclasses such as, odrl.Permission, odrl:Duty, and odrl:Prohibition. The odrl:Permission subclass may include a duty function, the odrl:Duty may include a consequence function, and the odrl.Prohibition may include a remedy function. The ActionExpression may include an included in function and an implies function.

In another exemplary embodiment, diagram 500 may include concepts such as, for example, DataExpression, Participant Expression, and UserExpression, which may be incorporated into the ontology to replace existing concepts in ODRL as well as to bind the ontology into SHACL via the sh:NodeShape concept. The DataExpression may include a hasPolicy function. The ParticipantExpression may include a sh:NodeShape subclass.

Figure 6:
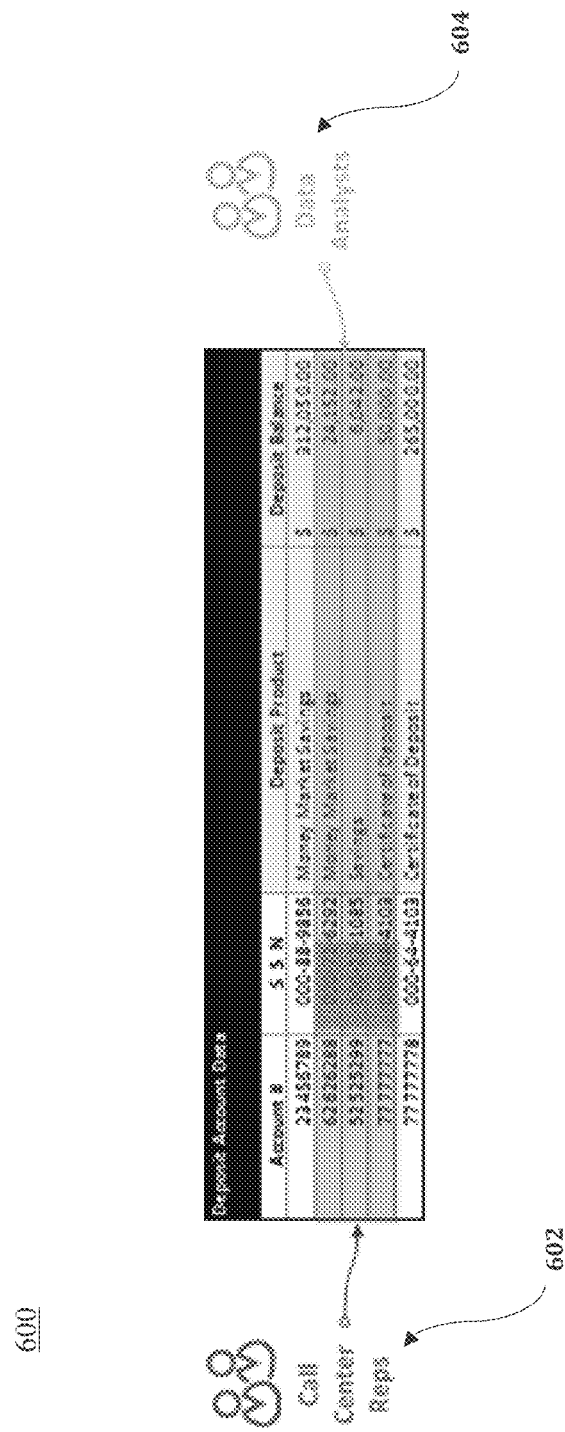
FIG. 6 is a diagram that illustrates data level access controls based on an exemplary process for implementing a method for controlling access to a set of data using access control policy and attributes of the set of data.

FIG. 6 is a diagram 600 that illustrates data level access controls based on an exemplary process for implementing a method for controlling access to a set of data using access control policy and attributes of the set of data. In diagram 600, data access policies may be used to describe which agents may have access to what data and under what conditions. The data access policies may be driven by business and regulatory requirements and may be very detailed. For example, call center representatives ("reps") 602, within a certain country, may need access to the account number, product, and balance for deposit accounts within that country. However, call center reps 602 may not have access to identifying information such as, for example, a social security number and may not have any access to the high value accounts. Likewise, the policy may dictate that data analysts 604 may have access to all products and balances in all countries. However, data analysts 604 may not have any access to the client identifiers such as, for example, account numbers and social security numbers.

In another exemplary embodiment, the policy in diagram 600 may be expressed as the following ODRL policy where call center reps 602 may not read government Ids:
  ex:AccessPolicy
  a odrl:Set
  prohibition:[
    target:ex:isGovernmentId
    Action:ex:readData,
    Assignee ex.isCallCenterRep
  ].

In another exemplary embodiment, the binding between the ODRL policy in diagram 600 and SHACL may be accomplished via a SHACL NodeShape such as, for example, the sh:NodeShape. The node shapes may specify constraints that need to be met with respect to focus nodes within a data graph Thus, the following shape, which may match any data in a database where the column in the physical model maps to a logical attribute, which maps to a data concept of "Government Id," may represent the data in diagram 600.
  ex: isGovernmentId
  a sh:NodeShape;
  sh:targetClass data:dataInDatabase;
  sh:property [
    sh:path(databaseColumnmapsToLogicalAttribute mapsToDataConcept);
    sh value ex:GovermentId
  ].

In another exemplary embodiment, the following shape, which may match any user who may be assigned the call center reps 602 role, may represent the user in diagram 600.
  ex:isCallCenterRep
  a sh:NodeShape;
  sh:targetClass Person;
  sh:property [
    sh: path (hasRole);
    sh:value ex:CallCenterRep
  ].

In another exemplary embodiment, the following shape may represent the action function in diagram 600.
  ex:readAction
  a sh:NodeShape;
  sh:targetClass Action;
  sh:property [
    sh:path (httpRequest methodName);
    sh:value "GET"
  ].

In another exemplary embodiment, the enterprise policy, for which a business and a regulator may want to enforce, may be independent of the way the data may be exposed in one or more data offerings. The enterprise policy may be defined against business taxonomies, which may be application-independent descriptions of the set of data. An individual data offering may embody logical models and physical models, and the mechanisms for an individual data offering may enforce the policy expressed against each model separately or against both models. Thus, by defining mappings between logical models, physical models, business taxonomy, and data lineage, enterprise policy expressed against the business taxonomy can be translated to operational policy for an individual data offering.

In another exemplary embodiment, the Scoped Access model may be an abstract model of how access to a set of data may be protected. In the Scoped Access model, the access decision may be rendered on the basis of the set of data, and not the application accessing the set of data. In another exemplary embodiment, the Scoped Access Reference Implementation (SARI) may be an assembled kit of existing components that may provide a concrete implementation of the Scoped Access model. The SARI may also be used to define interfaces such that each of the components of the architecture may be interchangeable with a strategic firmwide implementation.

In another exemplary embodiment, the Scoped Access model may determine access to data based on attributes such as, for example, physical data models of systems that store or manage data, logical data models of application-level descriptions of data, business taxonomies of application-independent descriptions of data, and data lineages containing information relating to the systems which manage the data as well as information relating to the way the data has flowed from one system to another.

In another exemplary embodiment, the Scoped Access model may be implemented to write policy at the highest level of a metamodel such as, for example, the business level where policy relates to fundamental notions in the business. The Scoped Access model may be implemented to navigate across links between business models and models expressed in lower metamodel levels to determine the description of the policy at the application level and the physical level. The links between the lower level metamodels and the higher level metamodels may enable the enforcement of the policy.

In another exemplary embodiment, the Scoped Access model may allow for the writing of policy at all metamodel levels as well as mixing and matching amongst various metamodel levels. For example, a policy may be written at various metamodel levels in situations where the system is unable to map policies coherently from business notions to application notions.

In another exemplary embodiment, the SARI may include components such as, for example, a set of linked data metamodels in RDF describing the set of data and the set of data lineage as well as import facilities for the set of data and the set of data lineage metamodels by scanning data sources from model repositories and other systems of reference.

The SARI may also include components such as, for example, a pair of linked metamodels in RDF for describing policy terms of control objectives, the shapes of the user, and the set of data, a binding of the shape in the policy to the scoped roles that may be granted to users in an open source multi-protocol instant messaging client, a user interface to author instances of the control objectives and shapes metamodels, and a mapping from the policy metamodel to the policy decisions in a Rego Query Language (RQL) used by the application programming interface policies.

Likewise, the SARI may include components such as, for example, bindings between the application programming interface policies and edges to allow partial evaluation of policy by the application programming interface, translations of residual policy to allow enforcement, and runtime resolution of scoped role grants at the point of enforcement.

Accordingly, with this technology, an optimized process for controlling access to a set of data using access control policy and attributes of the set of data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for controlling access to a set of data, the method being implemented by at least one processor, the method comprising:
   receiving, by the at least one processor via an interface, at least one request from at least one agent to access the set of data in at least one database,
      wherein the at least one database corresponds to a graph database that includes at least one graph structure for semantic queries with nodes, edges, and properties to represent and store the set of data;
   extracting, by the at least one processor, at least one access criterion relating to a predefined data access constraint and a predetermined data access policy from the at least one request,
      wherein the at least one access criterion includes agent identification information and terminal information, the terminal information corresponding to a device that made the at least one request; and
   determining, by the at least one processor, whether the at least one agent is to be granted access to the set of data using the at least one access criterion,
   wherein the at least one access criterion is based on at least one attribute that is associated with at least one element within the set of data.

2. The method of claim 1, further comprising:
   defining, by the at least one processor, a metamodel for at least one control objective;
   determining, by the at least one processor, a data framework based on the at least one request; and
   expressing, by the at least one processor, the metamodel in the determined data framework.

3. The method of claim 2, wherein the metamodel includes at least one class, the at least one class including at least one from among a policy class, an asset specification class, a party specification class, an action specification class, a rule class, and a constraint class.

4. The method of claim 2, wherein the at least one control objective includes a rule that defines a desired control outcome for a set of participants.

5. The method of claim 2, wherein the at least one access criterion is linked to the at least one control objective based on the at least one attribute.

6. The method of claim 1, wherein the at least one attribute is derived from at least one physical data model relating to a representation of systems that store and manage the set of data.

7. The method of claim 1, wherein the at least one attribute is derived from at least one logical data model relating to a representation of application-level descriptions of the set of data.

8. The method of claim 1, wherein the at least one attribute is derived from at least one business taxonomy relating to an enterprise-level classification of the set of data based on the predetermined data access policy, the business taxonomy including application-independent descriptions of the set of data.

9. The method of claim 1, wherein the at least one attribute is derived from at least one data lineage relating to lifecycle information for the set of data, the lifecycle information including at least one from among origin information for the set of data and movement history information for the set of data.

10. The method of claim 1, wherein the predetermined data access policy corresponds to at least one from among a business requirement, a regulatory requirement, a customer requirement, and an operational requirement.

11. A computing device configured to implement an execution of a method for controlling access to a set of data, the computing device comprising:
   a processor;
   a memory; and
   a communication interface coupled to each of the processor and the memory,
   wherein the processor is configured to:
      receive, via an interface, at least one request from at least one agent to access the set of data in at least one database, wherein the at least one database corresponds to a graph database that includes at least one graph structure for semantic queries with nodes, edges, and properties to represent and store the set of data:

extract at least one access criterion relating to a predefined data access constraint and a predetermined data access policy from the at least one request, wherein the at least one access criterion includes agent identification information and terminal information, the terminal information corresponding to a device that made the at least one request; and determine whether the at least one agent is to be granted access to the set of data using the at least one access criterion, wherein the at least one access criterion is based on at least one attribute that is associated with at least one element within the set of data.

12. The computing device of claim 11, wherein the processor is further configured to:
define a metamodel for at least one control objective;
determine a data framework based on the at least one request; and
express the metamodel in the determined data framework.

13. The computing device of claim 12, wherein the metamodel includes at least one class, the at least one class including at least one from among a policy class, an asset specification class, a party specification class, an action specification class, a rule class, and a constraint class.

14. The computing device of claim 12, wherein the at least one control objective includes a rule that defines a desired control outcome for a set of participants.

15. The computing device of claim 12, wherein the processor is further configured to link the at least one access criterion to the at least one control objective based on the at least one attribute.

16. The computing device of claim 11, wherein the processor is further configured to derive the at least one attribute from at least one physical data model relating to a representation of systems that store and manage the set of data.

17. The computing device of claim 11, wherein the processor is further configured to derive the at least one attribute from at least one logical data model relating to a representation of application-level descriptions of the set of data.

18. The computing device of claim 11, wherein the processor is further configured to derive the at least one attribute from at least one business taxonomy relating to an enterprise-level classification of the set of data based on the predetermined data access policy, the business taxonomy including application-independent descriptions of the set of data.

19. The computing device of claim 11, wherein the processor is further configured to derive the at least one attribute from at least one data lineage relating to lifecycle information for the set of data, the lifecycle information including at least one from among origin information for the set of data and movement history information for the set of data.

20. The computing device of claim 11, wherein the predetermined data access policy corresponds to at least one from among a business requirement, a regulatory requirement, a customer requirement, and an operational requirement.

* * * * *